(12) United States Patent
Roslund et al.

(10) Patent No.: US 12,255,433 B2
(45) Date of Patent: Mar. 18, 2025

(54) CONTINUOUS WAVE OPTICAL TWO-WAY TIME TRANSFER

(71) Applicant: Vector Atomic, Inc., Pleasanton, CA (US)

(72) Inventors: Jonathan David Roslund, Pleasanton, CA (US); Arman Cingoz, Pleasanton, CA (US)

(73) Assignee: Vector Atomic, Inc., Pleasanton, CA (US)

( * ) Notice: Subject to any disclaimer, the term of this patent is extended or adjusted under 35 U.S.C. 154(b) by 252 days.

(21) Appl. No.: 18/045,591

(22) Filed: Oct. 11, 2022

(65) Prior Publication Data

US 2024/0136786 A1  Apr. 25, 2024

(51) Int. Cl.
*H01S 3/13* (2006.01)
*G02F 2/02* (2006.01)

(52) U.S. Cl.
CPC ............... *H01S 3/13* (2013.01); *G02F 2/02* (2013.01); *G02F 2203/56* (2013.01)

(58) Field of Classification Search
CPC . H04L 7/0075; H04L 7/0008; H04B 10/0775; H04B 10/112; G02F 2/02; G02F 2203/56
See application file for complete search history.

(56) References Cited

U.S. PATENT DOCUMENTS

| | | | |
|---|---|---|---|
| 9,124,371 B2 * | 9/2015 | McNicol | H04B 10/572 |
| 10,389,514 B2 | 8/2019 | Sinclair et al. | |
| 11,063,740 B1 | 7/2021 | Cingoz et al. | |
| 11,387,914 B2 * | 7/2022 | Cingoz | H04B 10/70 |
| 11,515,994 B2 * | 11/2022 | Sinclair | H04B 10/112 |
| 11,581,946 B2 * | 2/2023 | El Amili | H01S 5/0623 |
| 11,695,473 B2 * | 7/2023 | Sakuma | H04B 10/079 398/16 |
| 2018/0294946 A1 * | 10/2018 | Sinclair | H04B 10/61 |
| 2018/0317184 A1 * | 11/2018 | Bushnell | H04B 10/00 |

(Continued)

OTHER PUBLICATIONS

Deschênes, J. D., Sinclair, L. C., Giorgetta, F. R., Swann, W. C., Baumann, E., Bergeron, H., . . . & Newbury, N. R. (2016). Synchronization of distant optical clocks at the femtosecond level. Physical Review X, 6(2), 021016.

(Continued)

*Primary Examiner* — Rhonda S Peace
(74) *Attorney, Agent, or Firm* — Patterson + Sheridan, LLP (57) ABSTRACT

Embodiments herein describe a continuous wave two-way optical time two-way transfer system. The embodiments herein lock a local frequency comb to a clock (e.g., optical/microwave atomic clock, Fabry-Perot optical reference cavity, etc.) in a local platform. The platform then generates two CW optical signals with different frequencies and locks those optical signals to the local frequency comb. The local platform then transmits its two CW optical signals to a remote platform and receives CW optical signals (having approximately the same frequencies as the two CW optical signals generated by the local platform) from the remote platform. Based on comparing its local CW optical signals with the received CW optical signals, the local platform can determine a timing deviation between its clock and a clock in the second platform.

20 Claims, 10 Drawing Sheets

(56) References Cited

U.S. PATENT DOCUMENTS

2019/0190692 A1    6/2019   Liu et al.
2024/0136786 A1*  4/2024   Roslund .............. H04J 14/0279

OTHER PUBLICATIONS

Shen, Q., Guan, J. Y., Ren, J. G., Zeng, T., Hou, L., Li, M . . . & Pan, J. W. (2022). 113 km Free-Space Time-Frequency Dissemination at the 19th Decimal Instability. arXiv preprint arXiv:2203.11272.

Gozzard, D. R., Howard, L. A., Dix-Matthews, B. P., Karpathakis, S. F. E., Gravestock, C. T., & Schediwy, S. W. (2022). Ultrastable free-space laser links for a global network of optical atomic clocks. Physical Review Letters, 128(2), 020801.

Dix-Matthews, B. P., Schediwy, S. W., Gozzard, D. R., Savalle, E., Esnault, F. X., Lévèque, T., ... & Wolf, P. (2021). Point-to-point stabilized optical frequency transfer with active optics. Nature communications, 12(1), 1-8.

Yang et al., "Frequency comb-to-comb stabilization over a 1.3-km free-space atmospheric optical link," Light: Science & Applications (2022)11:253, pp. 1-10, https://doi.org/10.1038/s41377-022-00940-3.

European Patent Office, Extended European Search Report for European Patent Application No. 23197359.5, dated Mar. 5, 2024.

\* cited by examiner

CONTINUOUS WAVE OPTICAL TWO-WAY TIME TRANSFER

BACKGROUND

Two-way optical time transfer often involves two sites or two vehicles exchanging optical pulses in free space with predefined repetition rates. Determining when the pulses arrive at each site enables the sites to extract timing deviation (if any) between the respective clocks and perform clock synchronization. In a simplistic example, each site can include a photodetector for detecting when the optical pulses transmitted by the other site arrives. However, jitter in the electronics does not allow the sites to determine the pulse arrival time with an accuracy greater than a picosecond. That is, the electronics distort the converted optical pulse which makes it difficult to accurately determine (e.g., with an accuracy greater than a picosecond) when the center of the pulses arrive. In many clock synchronization systems, greater accuracy is desired (e.g., femtosecond accuracy) between the clocks at the sites.

One strategy for the synchronization and syntonization of atomic clocks over optical free-space utilizes two frequency combs at each link site. The first frequency comb is stabilized to the local reference oscillator (e.g., atomic clock, Fabry-Perot optical reference cavity, etc.), and a second frequency comb is exchanged between sites over the link. In one implementation, the repetition rate of the exchanged comb is purposely offset from the reference oscillator stabilized comb. While this strategy has proven successful, it possesses several drawbacks. Notably, the use of a second comb at each site that is launched over the free-space link increases the complexity, power consumption, and expense of the system. Furthermore, the derived timing information and the SNR of its retrieval is limited by the duty cycle of the pulse-based system. This approach also requires careful dispersion management between the local frequency comb and the received frequency comb in order to avoid undesirable pulse broadening, which decreases the measurement sensitivity.

An alternative approach utilizes a continuous wave (CW) laser to transfer optical timing information between two sites over a free-space link. In this implementation, the master site splits the light to be transferred. One portion of it remains at the master site while the other portion is frequency shifted and sent across the free-space link to the remote site. At the remote site, a portion of the received light is sent back to the master site, where it is compared to the original local light sample. However, this method is prone to cycle slips and Doppler cancellation only works after the light has traversed the link twice (out to the remote site and back to the local site). Since the one-way link loss is squared, the power requirement for this approach is significantly higher.

SUMMARY

One embodiment described herein is a system that includes an optical subsystem configured to lock a frequency comb to a clock in a first platform and lock two continuous wave (CW) optical signals in the first platform to the frequency comb, wherein the two CW optical signals have different frequencies. The system also includes an electrical subsystem configured to determine a timing deviation between the clock in the first platform and a clock in a second platform based on exchanging, in free space, the two CW optical signals generated in the first platform with two CW optical signals generated in the second platform.

Another embodiment described herein is a method that includes locking a frequency comb to a clock in a first platform, locking two continuous wave (CW) optical signals in the first platform to the frequency comb where the two CW optical signals have different frequencies, and determining a timing deviation between the clock in the first platform and a clock in a second platform based on exchanging, in free space, the two CW optical signals generated in the first platform with two CW optical signals generated in the second platform.

Another embodiment described herein is a system that includes a first platform configured to transmit, in free space, two continuous wave (CW) optical signals having different frequencies to a second platform and the second platform is configured to transmit, in free space, two CW optical signals having different frequencies to the first platform. Moreover, the first and second platforms are configured to synchronize high-precision clocks based on exchanging the CW optical signals.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein describe a continuous wave (CW) two-way optical time transfer (TT) system that relies on fewer frequency combs than previous two-way optical TT techniques and does not require high power lasers like previous CW techniques. The embodiments herein lock a local frequency comb to a local reference oscillator (e.g., optical atomic clock, microwave atomic clock, Fabry-Perot optical reference cavity, etc.) in a local platform. The platform then generates two CW optical signals with different frequencies and locks those optical signals to the local frequency comb. The local platform then transmits its two CW optical signals to a remote platform and receives CW optical signals (having approximately the same frequencies as the two CW optical signals generated by the local platform) from the remote platform. Based on comparing its local CW optical signals with the received CW optical signals, the local platform can determine a timing deviation between its local reference oscillator (e.g., a local clock) and a remote reference oscillator (or clock) in the second platform.

Figure 1:
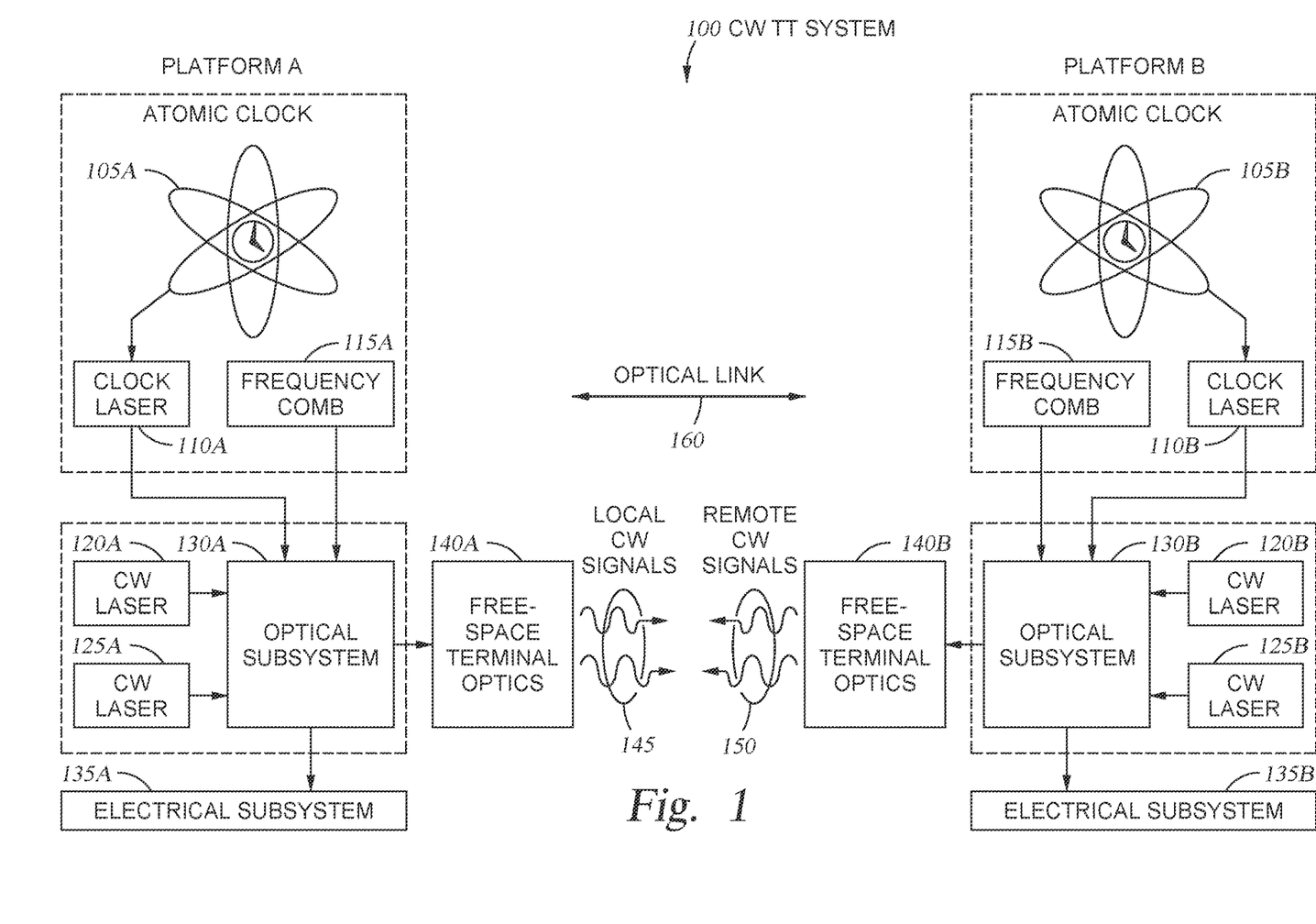
FIG. 1 illustrates a continuous wave two-wave optical time transfer system, according to one embodiment.

FIG. 1 illustrates a CW optical TT system 100, according to one embodiment. The CW TT system 100 includes Platform A and Platform B which may be disposed at different locations on the earth's surface that are within line of sight (LOS) of each other, either directly or through the use of one or more mirrors. In another embodiment, one of the platforms is disposed at a stationary location (or site) on the earth's surface while the other platform is disposed on a moving vehicle—e.g., a ground vehicle or a flying vehicle such as a plane, drone, or satellite. In yet another embodiment, both of the platforms may be disposed on moving platforms such as a car and a plane, two planes, two satellites, one plane and one satellite, etc.

In this example, Platforms A and B have the same components—i.e., an atomic clock 105, clock laser 110, frequency comb 115, two CW lasers 120, 125, an optical subsystem 130, an electrical subsystem 135, and free-space terminal optics 140. While an atomic clock 105 is shown, any kind of high precision clock can be used. The atomic reference 105 is used the stabilize the frequency of the clock laser 110, which generates an optical signal that is transmitted to the optical subsystem 130. The frequency comb 115 also generates an optical signal that is transmitted to the optical subsystem 130. The frequency comb 115 generates a train of light pulses with a repetition rate that is in the easy-to-measure radio-frequency range, unlike the optical frequency of the clock laser 110.

As discussed in more detail below, the optical subsystem 130 locks (or stabilizes) the optical signal generated by the frequency comb 115 (which may be self-referenced) to the optical signal generated by the clock laser 110. This process transfers the fractional instability of the atomic clock 105 to the optical signal generated by the self-referenced frequency comb 115. Thus, any jitter in the clock 105 is transferred to the optical signal generated by the frequency comb 115. However, instead of using a self-referenced comb 115, the frequency comb 115 can be locked to two lasers. For example, the second harmonic of a seed laser could be used to generate a second laser which can be locked to the frequency comb 115.

The CW lasers 120, 125 transmit two optical signals to the optical subsystem 130. In one embodiment, the two optical signals are not pulsed. That is, unlike TT schemes that transmit pulsed optical signals, the two optical signals are CW waves that are not pulsed (e.g., are unmodulated). However, these optical signals are CW waves at different frequencies. For example, the optical signals may have frequencies that differ by more than 50 GHz, and in one embodiment, differ by 100 GHz or more. The frequency difference or offset between the lasers 120, 125 may vary based on the application. As discussed below, the smaller the frequency difference, the easier it is for the platforms to track the cycles (or fringes), but it is also more difficult to discriminate timing jitter between the clock 105A in Platform A and the clock 105B in Platform B. Thus, the frequency difference or offset can depend on the particular implementation.

In one embodiment, the CW lasers 120, 125 have wavelengths that are around 1550 or 1560 nanometers since these lasers are common in many telecommunication systems.

The optical subsystem 130 locks (or stabilizes) both of the CW lasers 120, 125 to the optical signal generated by the frequency comb 115. Thus, the fractional instability of the atomic clock 105 is transferred to the optical signals generated by the CW lasers 120, 125. That is, any jitter in the clock 105 is transferred to the optical signal generated by the frequency comb 115, which in turn transfers that jitter to the optical signals generated by the CW lasers 120, 125.

The terminal optics 140 transmit the two CW optical signals to the other platform via a free space optical link 160. In this case, FIG. 1 is from the perspective of Platform A where its local CW signals 145 are transmitted to the free-space terminal optics 140B of Platform B while the remote CW signals 150 generated by Platform B are received at the terminal optics 140A of Platform A. That is, the two platforms exchange their two CW optical signals. In general, the CW optical signals have similar frequencies in that a first one of the local CW optical signals 145 generated by Platform A has a same frequency (or a known frequency offset) as a first one of the remote CW signals 150 generated by Platform B and a second one of the local CW optical signals 145 generated by Platform A has a same frequency (or a known frequency offset) as a second one of the remote CW signals 150 generated by Platform B.

The local and remote CW signals 145, 150 are compared to each other in the optical subsystem 130. In one embodiment, two beatnotes are produced in the optical subsystem 130 between the two pairs of CW lasers. The electrical subsystem 135 can then determine a differential phase jitter between these two beatnote pairs which reveals the relative group delay jitter between the two frequency combs 115 in the two platforms. This is discussed in more detail in FIGS. 2-4. Using the differential phase jitter, the platforms can determine a timing deviation between the atomic clock 105A and the atomic clock 105B. Determining the timing deviation is discussed in more detail in FIGS. 5 and 6.

Figure 2:
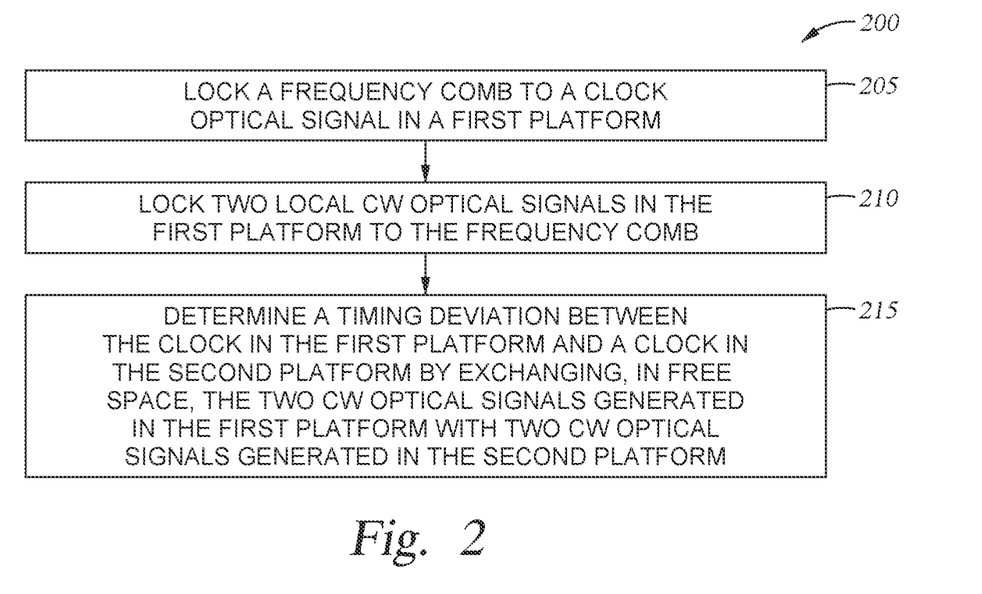
FIG. 2 is a flowchart for determining a timing deviation from performing continuous wave two-way optical time transfer, according to one embodiment.

FIG. 2 is a flowchart of a method 200 for determining a timing deviation from performing CW optical TT, according to one embodiment. The technique illustrated in FIG. 2 may be performed simultaneously at both Platform A and Platform B in FIG. 1.

At block 205, a first platform locks a frequency comb to a clock optical signal. Referring to FIG. 1, the optical subsystem 130A receives optical signals from the clock laser 110A and the frequency comb 115A. The subsystem 130A locks (or stabilizes) the optical signal of the frequency comb 115 to the optical signal generated by the clock laser 110, thereby transferring the fractional instability of the atomic clock 105 to the optical signal generated by the frequency comb 115A. In some embodiments, the comb 115A is self-referenced, or alternatively, the frequency comb 115A can be locked to two lasers.

At block 210, the first platform locks two local CW optical signals to the optical signal generated by the frequency comb. For example, the optical subsystem 130A receives optical signals from the CW lasers 120A and 125A which are then locked to the optical signal of the frequency comb 115A so now the fractional instability of the atomic clock 105 is transferred to the optical signals generated by the CW lasers 120A and 125A. Notably, the frequencies of the optical signals generated by the CW lasers 120A and 125A are different.

At block 215, the first platform determines a timing deviation between its clock and a clock in the second platform by exchanging, in free space, the two CW optical signals generated in the first platform with the two CW optical signals generated in the second platform. This is illustrated in FIG. 1 where the local CW signals 145 generated by Platform A are transmitted to Platform B and the remote CW signals 150 generated by Platform B are received at Platform A. The details for determining the timing deviation are discussed in the figures that follow.

Once the timing deviation is determined, one or both of the atomic clocks in the platforms can be adjusted so they have the same time, which can include performing both frequency synching (syntonization) and phase adjustment (synchronization). For example, measurements made at each platform can be transmitted to the other using conventional means (e.g., radio frequency transmission) to stabilize the link.

Figure 3:
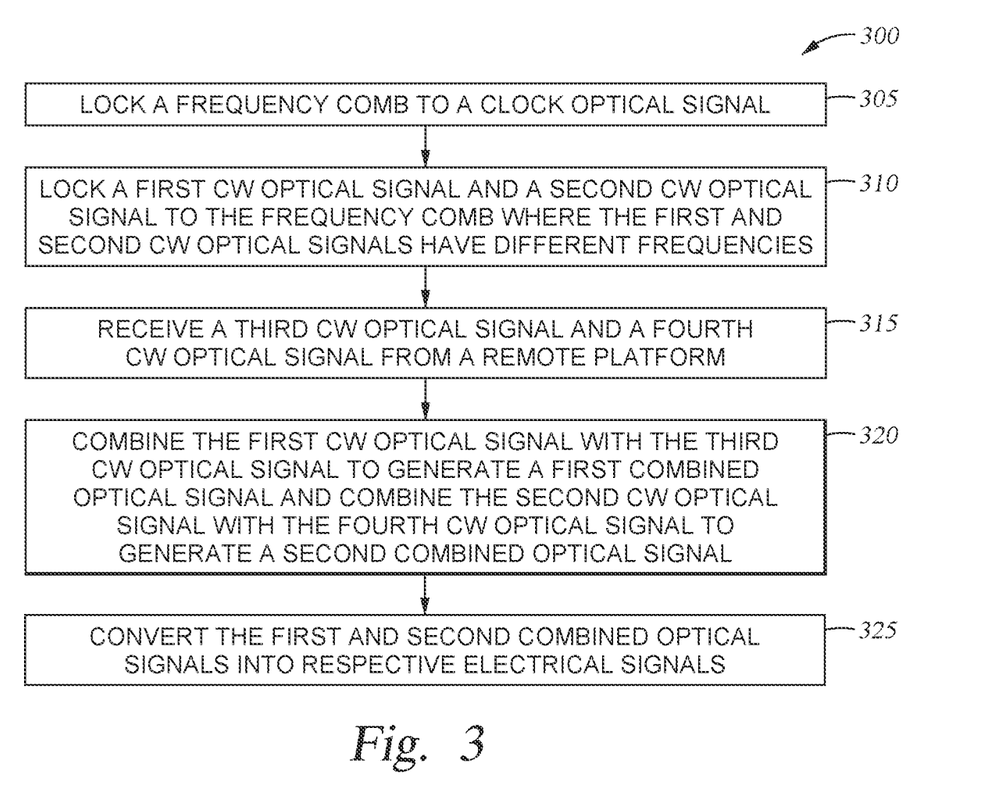
FIG. 3 is a flowchart for performing a continuous wave two-way optical time transfer, according to one embodiment.

FIG. 3 is a flowchart of a method 300 for performing CW optical TT, according to one embodiment. The technique illustrated in FIG. 3 may be performed simultaneously at both Platform A and Platform B in FIG. 1. Further, each block in the method 300 is discussed in tandem with FIG. 4A, which illustrates a photonic integrated circuit and electrical components for performing a CW optical TT.

Figure 4A:
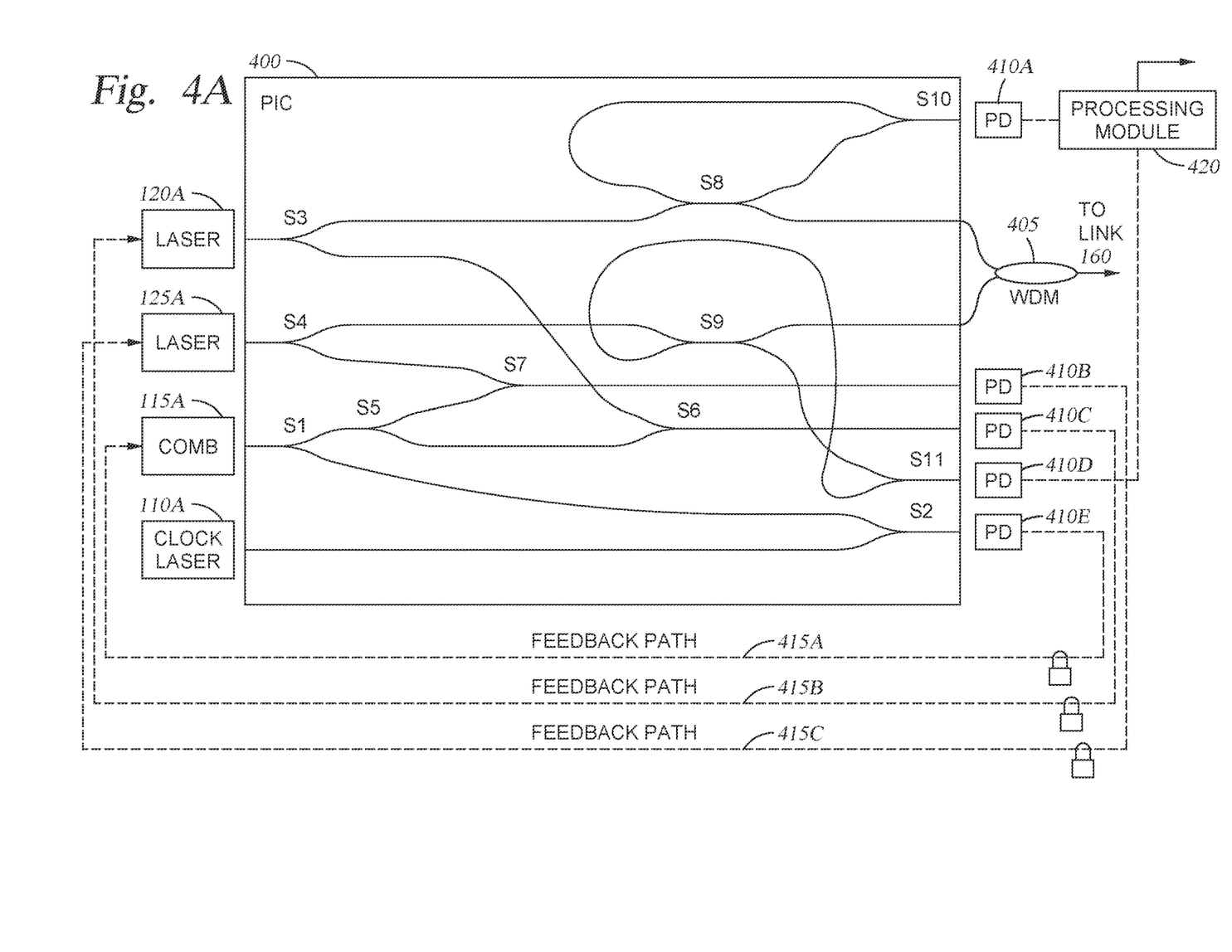
FIGS. 4A and 4B illustrate photonic integrated circuits and electrical components for performing a continuous wave two-way optical time transfer, according to one embodiment.

At block 305, a first platform locks a frequency comb to a clock optical signal. Referring to FIG. 4A, it illustrates a photonic integrated circuit (PIC) 400 that receives an optical signal from the frequency comb 115A and an optical signal from the clock laser 110A. The clock laser 110A can have a frequency $f_{opt}^A$ and has been stabilized to an atomic reference (e.g., an atomic clock).

Figure 8:
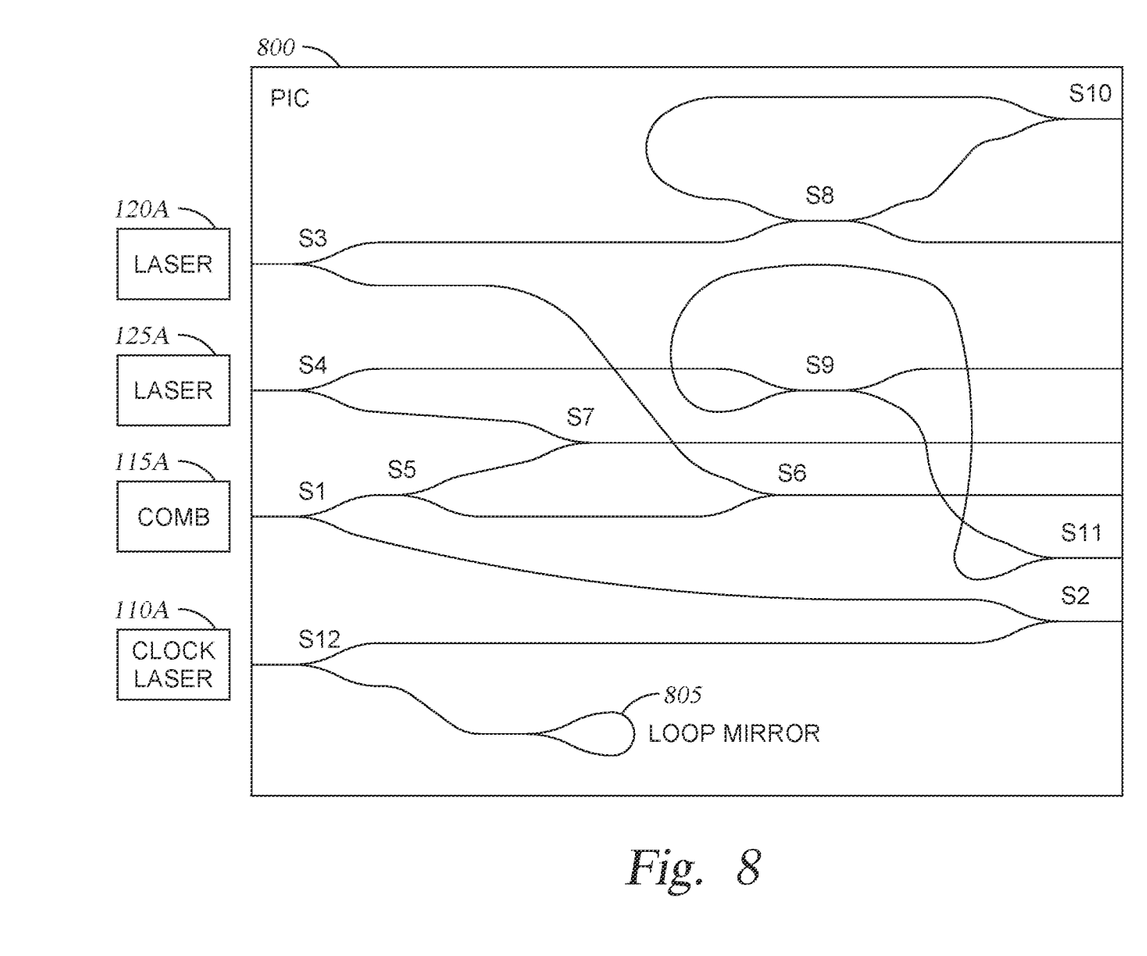
FIGS. 8-10 illustrate photonic integrated circuits, according to one embodiment.

The frequency comb is split by the splitter S1 (e.g., a Y-junction or Y-splitter). A portion of this comb light is combined with the clock light at splitter S2, where it exits the PIC 400 and is detected with photodetector (PD) 410E. In one embodiment, the comb 115A is then stabilized using the optical beatnote generated by the PD 410E in a feedback path 415A as well as a f-2f self-referencing scheme to generate a self-referenced comb 115A (not shown, but may also be included on the PIC as shown in FIG. 8). In this manner, the PIC 400 transfers the stability of the optical frequency reference (e.g., the atomic clock) to the frequency comb 115A.

In another embodiment, the PIC 400 transfers the stability of the optical frequency reference (e.g., the atomic clock) to the frequency comb 115A without self-referencing the frequency comb 115A. In that example, two clock lasers are separately combined in the PIC 400 with the frequency comb 115A where the two combined optical signals are detected by separate PDs. In one embodiment, the two clock lasers can be generated when adjusting the wavelength of a seed laser, where a second harmonic can be used as a second clock laser.

In another embodiment, if a microwave clock (e.g., a microwave atomic clock) is used as the local reference oscillator rather than an optical clock, instead of locking the frequency comb 115A to a clock laser, the frequency comb 115A can be locked to the microwave clock electronically. In that case, the PD 410E can be used to detect the frequency comb 115A repetition rate (without combining the frequency comb 115A with any other optical signals). The repetition rate of the frequency comb 115A can then be identified using the output of the PD 410E and locked to the microwave clock. The other degree of freedom for the frequency comb 115A is then locked with self-referencing.

At block 310, the first platform locks two local CW optical signals to the optical signal generated by the frequency comb. Two CW lasers 120A and 125A are introduced onto the PIC 400, and each is split with splitters S3 and S4. The remaining comb light is split at splitter S5, where it is combined with the light from splitters S3 and S4 (i.e., the lasers 120A and 125A) by splitters S6 and S7, respectively. The combined outputs from splitters S6 and S7 are detected by PD 410C and PD 410B, respectively. The beatnotes from the PD 410C and PD 410B are used to phase lock the lasers 120A and 125A to the frequency comb 115A, respectively, via feedback paths 415B and 415C. This process transfers the stability of the atomic clock to the lasers 120A and 125A.

The electric field of the light exiting splitter S3 can be expressed as: $\sqrt{P_1^A} \cdot \cos[2\pi(f_1^A + \Delta_1^A)\,t]$, where $P_1^A$ is the power of laser 120A at Platform A, $f_1^A$ is the frequency of the comb tooth to which the laser 120A is phase-locked at Platform A, and g is the offset frequency between the laser 120A and the comb tooth $f_1^A$ at Platform A. An analogous expression exists for the laser 125A.

The laser 120A stabilized light exiting the upper port of the splitter S3 is then split again at coupler S8 and a similar process occurs for laser 125A at the coupler S9. One part of the outputs at couplers S8 and S9 exits the PIC 400, where they are combined at an external wavelength division multiplexer (WDM) 405, which can be a fiber optic component. The combined output of this WDM 405 is then transmitted, in free space, on the link 160 to the other platform (e.g., Platform B). In one embodiment, the WDM 405 is separate from the PIC 400, but in other embodiments, the WDM 405 could be on the PIC 400 and be implemented using, for example, an arrayed waveguide grating (AWG).

Platform B can have an identical optical configuration with two lasers of nominally the same free-running frequency as those at Platform A. The stabilization process described above also occurs at Platform B. Thus, the two Platform B CW lasers possess the same frequency instability as the atomic reference or clock at Platform B, $f_{opt}^B$.

At block 315, the first platform receives a third CW optical signal and fourth CW optical signal from a remote platform. For example, the optical link 160 is bi-directional so that light from Platform B crosses the link, is received by the two-way terminal at Platform A, and enters the WDM 405. The two lasers transmitted by Platform B are separated by the WDM 405 and are coupled onto the PIC 400.

At block 320, the PIC combines the first CW optical signal and the third CW optical signal to generate a first combined optical signal. The PIC also combines the second CW optical signal with the fourth CW optical signal to generate a second combined optical signal. In FIG. 4A, the received CW optical signals enter the couplers S8 and S9, where they mix with the local CW lasers 120A and 125B of Platform A. The combined fields of the optical signals at splitters S10 and S11 may then be written as:

$$E_{S10} = \sqrt{P_{1,LO}^A} \cdot \cos[2\pi(f_1^A + \Delta_1^A)t] + \sqrt{T_{link} \cdot P_{1,link}^B} \cdot \cos[2\pi(f_1^B + \Delta_1^B) \cdot (t - n_1 L/c)]$$

$$E_{S11} = \sqrt{P_{2,LO}^A} \cdot \cos[2\pi(f_2^A + \Delta_2^A)t] + \sqrt{T_{link} \cdot P_{2,link}^B} \cdot \cos[2\pi(f_2^B + \Delta_2^B) \cdot (t - n_2 L/c)]$$

where $T_{link}$ is the link loss and $n_{1,2}$ are the indices of refraction of the link for lasers 120A and 125A. It should be noted that differential phase noise between the two ports of the WDM 405 and the PIC 400 can be captured by defining unique indices of refraction $n_{1,2}$ for each laser.

At block 325, the first platform converts the first and second combined optical signals into respective electrical signals. In FIG. 4A, the combined light fields are detected at PD 410A and PD 410D. The photocurrent at PD 410A is expressed as:

$$i_4^A = R \cdot \{P_{1,LO}^A + T_{link} \cdot P_{1,link}^B + 2\sqrt{T_{link} \cdot P_{1,LO}^A P_{1,link}^B} \cdot \cos[2\pi(f_1^A - f_1^B)t + 2\pi(\Delta_1^A - \Delta_1^B)t + 2\pi(f_1^B + \Delta_1^B) \cdot n_1 L/c]\}$$

where R is the photodiode responsivity, and the signal has been appropriately low-pass filtered. The first two terms of this expression for the detected photocurrent appear at DC, but the third term appears at AC. The first term of the AC sinusoid is what the Platforms A and B detect in order to identify the timing deviation. It is nominally a very small temporal variation that describes the relative frequency instability of the atomic clock at Platform A with respect to the one at Platform B. The second term is user controllable and is determined by the offset lock frequencies at the two platforms. The third term can vary rapidly since the link distance L and/or index of refraction may be unstable during the acquisition. A similar expression describes the photocurrent at PD 410D:

$$i_5^A = R \cdot \{P_{2,LO}^A + T_{link} \cdot P_{2,link}^B + 2\sqrt{T_{link} \cdot P_{2,LO}^A P_{2,link}^B} \cdot \cos[2\pi(f_2^A - f_2^B)t + 2\pi(\Delta_2^A - \Delta_2^B)t + 2\pi(f_2^B + \Delta_2^B) \cdot n_2 L/c]\}$$

Referring to the structure in FIG. 4A, in one embodiment, the PIC 400 and the optical components therein (e.g., the splitters) form the optical subsystem 130 in FIG. 1. However, instead of implementing the optical subsystem 130 as a PIC, in other embodiments, the optical subsystem 130 may be discrete splitters that are coupled by optical fibers. In yet another embodiment, the optical subsystem 130 may include optical components that are coupled using free-space communication paths. Thus, the PIC 400 is just one example of a suitable optical subsystem 130.

The PDs 410A-E, the feedback paths 415A-C, and a processing module 420 may form part of the electrical subsystem 135. In addition, the electrical subsystem 135 may include other optical components (e.g., hardware or software) for processing the signals output by PDs 410A and 410D, which is discussed in FIGS. 5 and 6. The electrical subsystem 135 can include an application specific IC (ASIC), FPGA, computer system, and the like for implementing the processing module 420.

In one embodiment, the WDM 405 is part of the free-space terminal optics 140. In addition, the optics 140 may include other optical components such as a telescope or focusing element to direct the CW optical signals towards the remote platform.

Figure 4B:
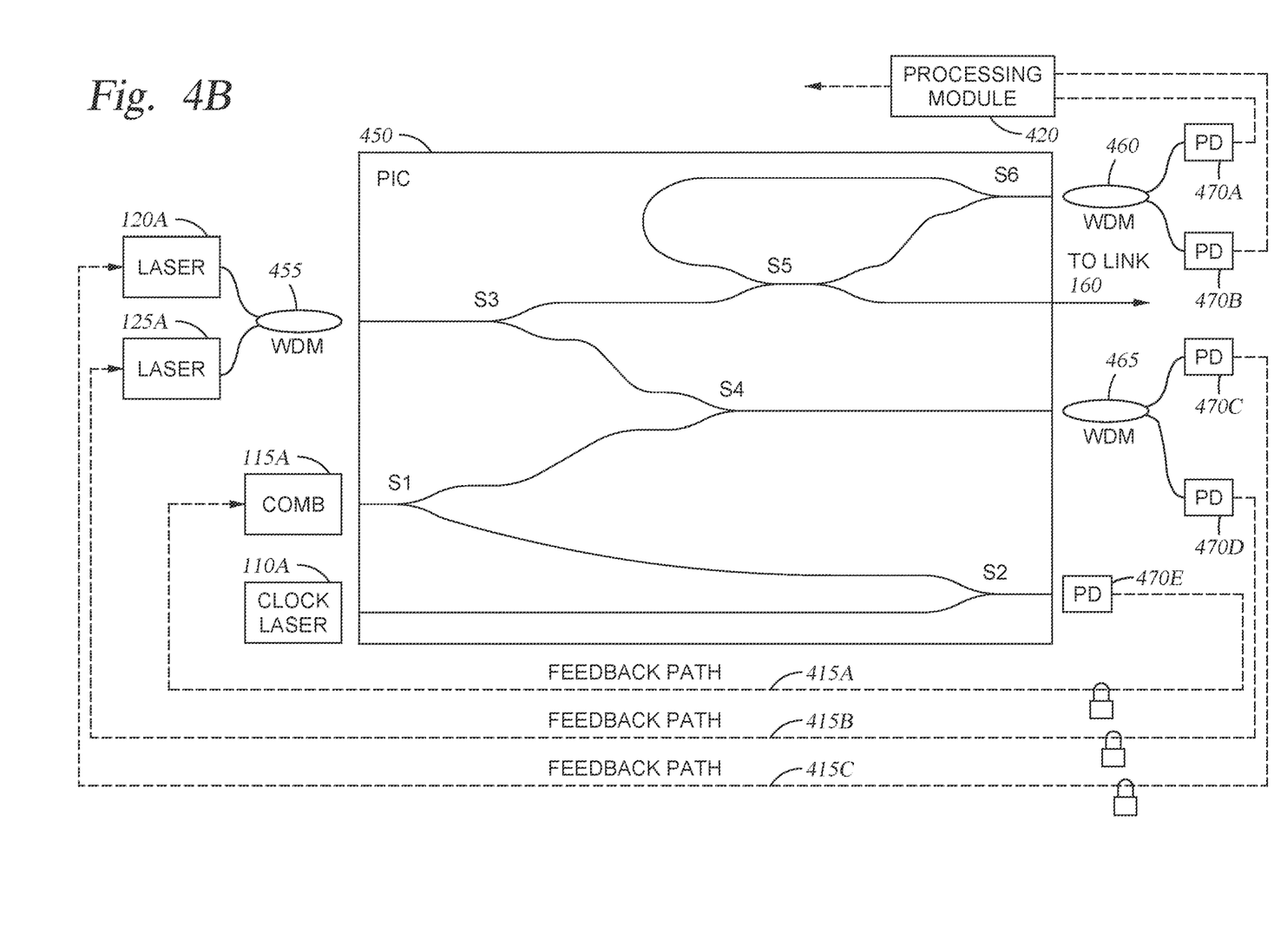

FIG. 4B illustrates PIC 450 and electrical components for performing a continuous wave two-way optical time transfer, according to one embodiment. Like the PIC 400 in FIG. 4A, the PIC 450 includes the lasers 120A and 125A, the comb 115A, and the clock laser 110A. However, unlike the PIC 400, the system includes a WDM 455 that combines the lasers 120A and 125A into a combined optical signal and then transmits that optical signal onto the PIC 450. This combined optical signal is split at S3 where a portion of this signal is combined, at S4, with a portion of the comb 115A. This correlates to S7 and S6 in the PIC 400 in FIG. 4A. However, instead of using separate waveguides to combine the laser signals with the comb 115, the PIC 450 uses one waveguide. A WDM 465 can then be used to separate out the signals according to frequency into two signals. One signal is detected by the PD 470C and used in feedback 415C to adjust the laser 120A while the other signal is detected by PD 470D and used in feedback path 415B to adjust the laser 125A. In one embodiment, the beatnotes from the PD 470C and PD 470D are used to phase lock the lasers 120A and 125A to the frequency comb 115A, respectively, via feedback paths 415B and 415C. This process transfers the stability of the atomic clock to the lasers 120A and 125A as discussed above.

The upper output of the splitter S3 is then split again at coupler S5. One part of the output at coupler S5 exits the PIC 450 and is then transmitted, in free space, on the link 160 to the other platform (e.g., Platform B). The combined signal received from Platform B on the link 160 is received at the coupler S5 and combined with the combined signals of the lasers 120A and 125A at coupler S6. The output of the coupler S6 is separated according to frequency into two signals by a WDM 460, which are detected by the PDs 470A and 470B. The resulting electrical signals are transmitted to the processing module 420 as discussed above.

The PIC 450 also includes a splitter S1 and coupler S2 for combining the comb 115A and the clock laser 110A which is essentially the same as the PIC 400. This output is detected by the PD 470E and used in the feedback path 415A.

Figure 5:
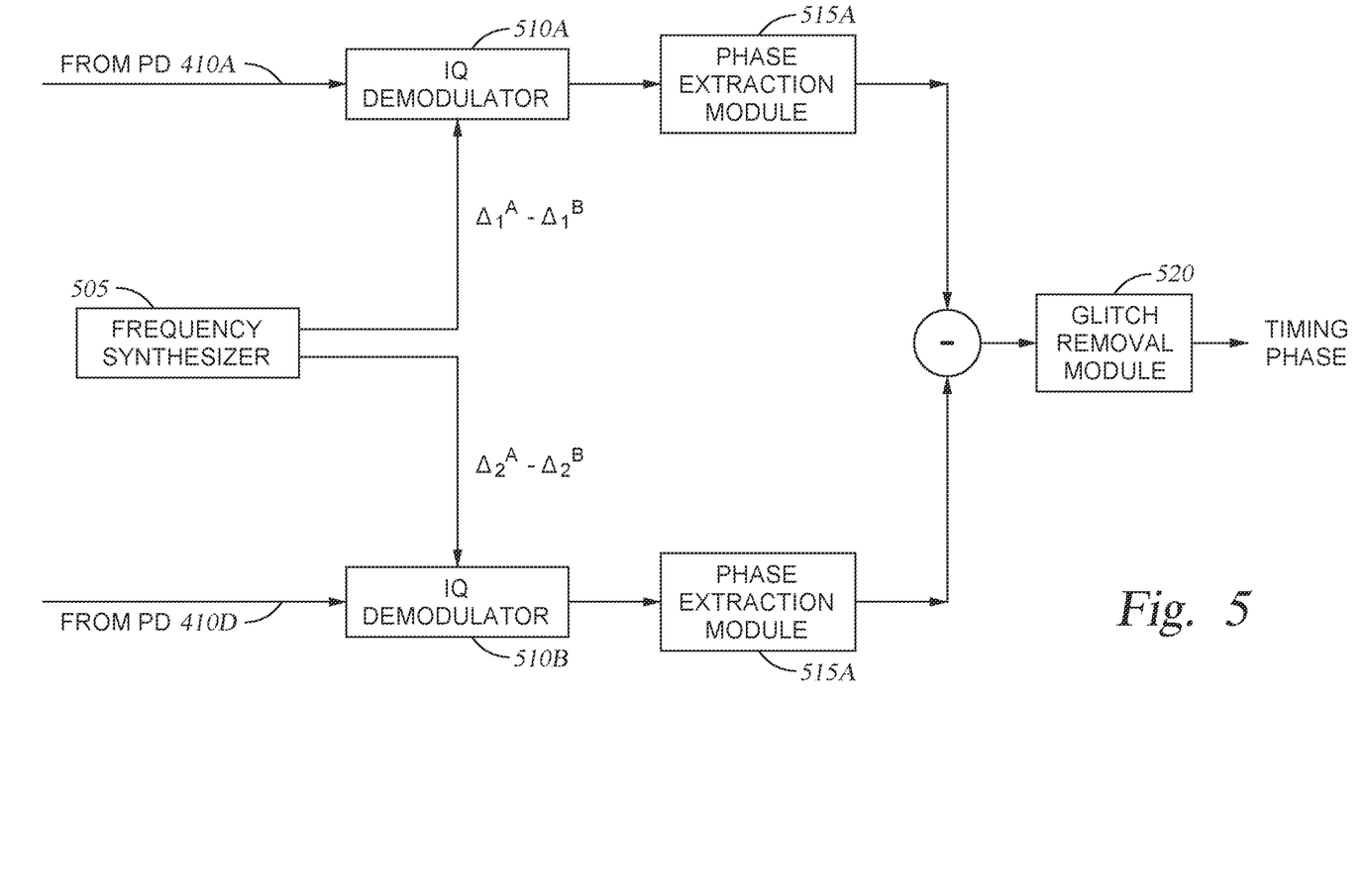
FIG. 5 is a diagram of synchronizing clocks between two platforms, according to one embodiment.

FIG. 5 is a block diagram of a processing module for synchronizing clocks between two platforms, according to one embodiment. FIG. 5 is one example of the processing module 420 in FIG. 4A. FIG. 5 illustrates a pair of IQ demodulators 510A and 510B receiving the electrical signals generated by the PD 410A and 410D as discussed above. A frequency synthesizer 505 provides known offset frequencies $\Delta_1^A - \Delta_1^B$ and $\Delta_2^A - \Delta_2^B$ where each signal is demodulated by the IQ demodulators 510 at the known offset frequencies $\Delta_1^A - \Delta_1^B$ and $\Delta_2^A - \Delta_2^B$, respectively. Phase extraction modules 515A and 515B extract the phase of the demodulated signals:

$$\psi_1^A = 2\pi(f_1^A - f_1^B)t + 2\pi(f_1^B + \Delta_1^B) \cdot n_1 L/c,$$

with a corresponding equation for $\psi_2^A$.

These two phases are then subtracted from each other to yield:

$$\Phi_1^A - \psi_2^A = \psi^A = 2\pi(f_1^A - f_2^A)t - 2\pi(f_1^B - f_2^B)t + \phi_{link}^B$$

where the optical phase of the link $\phi_{link}^B$ experienced by the two CW lasers originating at Platform B is given as $\phi_{link}^B = 2\pi(n_1 f_1^B - n_2 f_2^B + n_1 \Delta_1^B - n_2 \Delta_2^B)L/c$. The extracted phase of each signal can rapidly vary in time due to turbulence in the optical path and may wrap between 0 to $2\pi$. As a result, the signal can be sampled fast enough to capture the phase wraps in the difference signal so that they can be unwrapped, for example, in a digital signal processor. Since the two CW laser frequencies are similar, the rapid phase fluctuations are highly correlated and only lead to momentary glitches in the phase difference near the phase wrap points, which can be rejected using an appropriate thresholding condition by a glitch removal module 520.

The optical frequency $f_1^A$ is re-written as if $f_1^A = \langle f_1^A \rangle + \delta f_1^A$, where $\langle f_1^A \rangle$ is the steady-state value of the comb tooth $f_1^A$, and $\delta f_1^A$ represents the slow temporal jitter of this tooth that originates from atomic clock instabilities. Similar representations exist for the three other considered comb frequencies: $f_2^A$, $f_1^B$, and $f_2^B$. This then allows writing the de-modulated phase $\psi^A$ as:

$$\psi^A = 2\pi(\delta f_1^A - \delta f_2^A)t - 2\pi(\delta f_1^B - \delta f_2^B)t + \phi_{link}^B$$

where it is assumed that the average frequency spacing between the stabilized CW lasers at the two sites are equal: $\langle f_1^A \rangle - \langle f_2^A \rangle = \langle f_1^B \rangle - \langle f_2^B \rangle$. The differential phase jitter between the frequencies $f_1^A$ and $f_2^B$ is proportional to the group delay jitter of the frequency comb to which the two lasers are locked with a proportionality constant given by the frequency spacing between the two lasers. Stated differently, this measurement scheme reveals the time evolution of the linear spectral phase between the two CW laser frequencies, and linear spectral phase is directly responsible for group delay of the frequency comb pulse train. This permits a phase extraction module 515 to recast the differential spectral phase $2\pi(\delta f_1^A - \delta f_2^A)t$ as:

$$2\pi(\delta f_1^A - \delta f_2^A)t = 2\pi((f_1^A(-)(f_2^A))\cdot\tau_A = 2\pi\cdot\Delta f_{12}^A\cdot\tau_A$$ where $\tau_A$ is the group delay jitter of the frequency comb at Platform A. The de-modulated phase $\psi^A$ is finally written as:

$$\psi^A = 2\pi\Delta\Delta f_{12}(\tau_A - \tau_B) + \phi_{link}^B$$

where the requirement of equal CW laser spacings between the two sites allows writing $\Delta f_{12}^A = \Delta f_{12}^B = \Delta f_{12}$.

An analogous detection scheme is implemented at Platform B, which recovers the de-modulated phase $\psi^B$ as:

$$\psi^B = 2\pi\Delta f_{12}(\tau_B - \tau_A) + \phi_{link}^A$$

Each platform then proceeds in one of two possible manners to report/receive phase over a communication channel. One approach (referred to as an open loop approach) is to log the retrieved phase $\psi^{A,B}$ at each platform. Due to turbulence of the free-space link, the phase $\phi_{link}^{A,B}$ can rapidly vary between 0 and $2\pi$. If the free-space link is reciprocal, the optical phases associated with the link path length are equivalent, i.e., $\phi_{link}^A = \phi_{link}^B$. Hence, the rapid fluctuations in the de-modulated phases $\psi^{A,B}$ are highly correlated. Notably, this condition is only strictly true if:

$$n(f_{1Alaser1}^A)f_{laser\ 1}^A - n(f_{laser\ 2}^A)f_{laser\ 2}^A = n(f_{laser\ 1}^B)f_{laser\ 1}^B - n(f_{laser\ 2}^B)f_{laser\ 2}^B,$$

where $n(f)$ is the index of refraction at frequency $f$, and $f_{laser\ 1,2}^{A,B}$ are the frequencies of the CW lasers 1 and 2 at platform A and B, respectively. This condition can be satisfied with the appropriate choice of $\Delta_{1,2}^{A,B}$ (the CW laser offset from the comb teeth) for a given index of refraction profile for the optical path between the platforms.

After recording these phase measurements at each platform, the information is exchanged with the other site via an optical or microwave communication channel where the difference between the local and remote phases can be extracted. This allows deducing the relative jitter of the comb at one site with respect to the other as:

$$\tau_A - \tau_B = (\psi^A - \psi^B)4\pi\Delta f_{12}.$$

The derivation of this information may be used to steer the repetition rate of one frequency comb with respect to the other. There are at least two ways to do this: feedback on the comb repetition rate, or feedback on the clock laser to synchronize both the optical and microwave outputs of the clock.

A second approach (referred to as a closed loop approach) is for each platform to implement a servo that stabilizes its locally retrieved phase $\psi^{A,B}$ to a fixed value. One possibility is to continually tune the phase or frequency of the CW laser offset locks. The quantitative relationship between this control signal and the phase $\psi^{A,B}$ depends upon the manner in which the servo is implemented. The control signal at each platform is then directly proportional to the locally measured phases $\psi^{A,B}$. Thus, the relative timing deviations and link length are directly mapped onto the control effort. The control signal at each platform is exchanged with the other site via an optical or microwave communication channel where the difference between the local and remote phases can be extracted. This approach effectively linearizes the phase fluctuations with the servo and removes the phase wraps. At the end of this process, the combs on the two Platforms are synchronized similar to the first approach by feeding back on comb repetition rate or clock laser frequency.

One advantage of the techniques above is that they are not sensitive to the fringe number of the recovered heterodyne beat at each platform. The optical path length induced by turbulence may vary by distances much larger than the synthetic wavelength $\lambda_{12} = c/\Delta f_{12}$ with no loss of information provided that both platforms are able to retrieve and log the phases $\psi^{A,B}$ faster than the characteristic timescale of their fluctuations.

Figure 6:
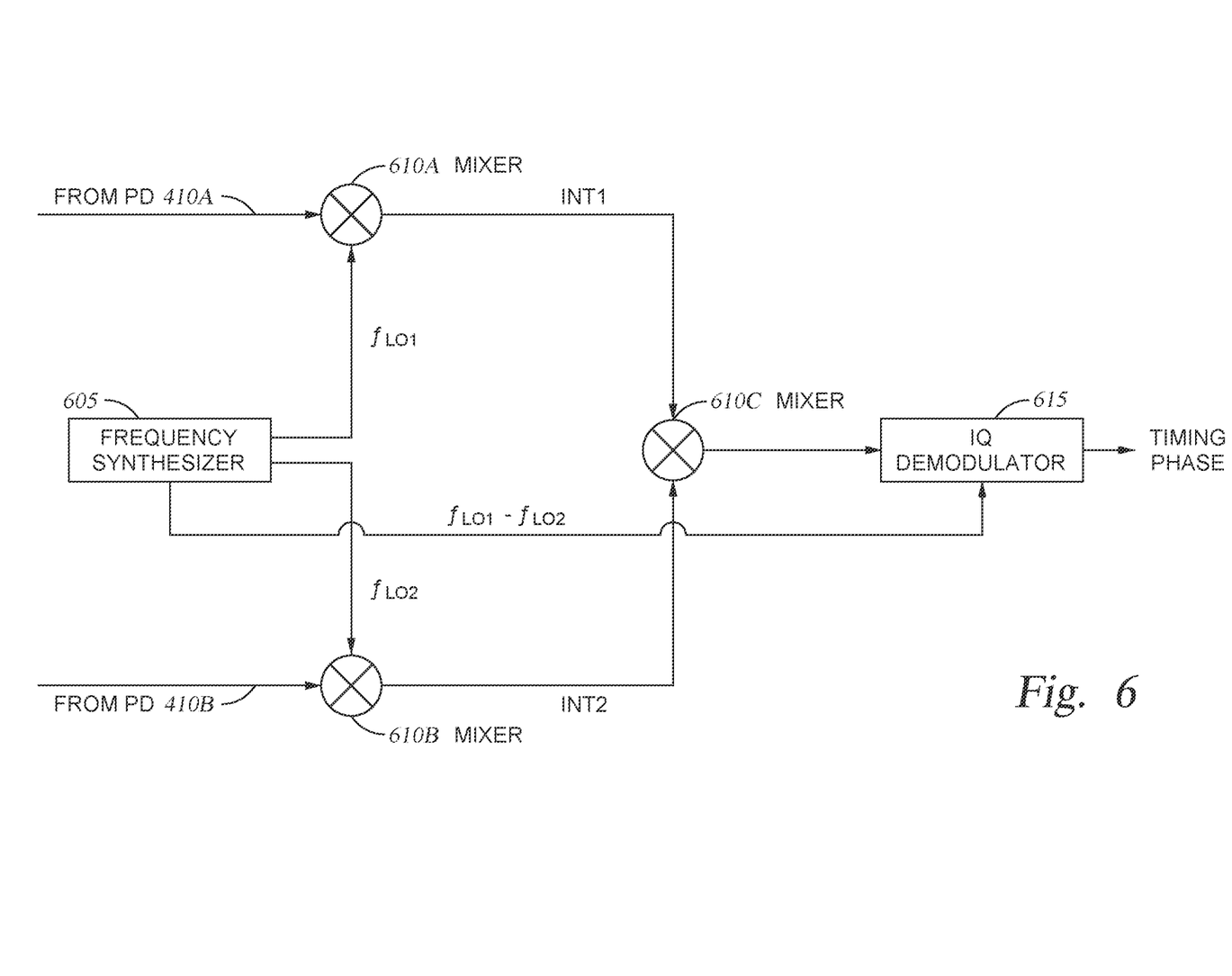
FIG. 6 is a diagram of synchronizing clocks between two platforms, according to one embodiment.

Additionally, the techniques above are not sensitive to the absolute fringe number, which means that changing the fringe number following a period of signal dropout has no effect on the information retrieval so long as the two atomic clocks do not drift away from each other by more than one fringe period during any blackout. For example, a typical fringe period is several picoseconds which would be an abnormally large drift for an atomic clock during a blackout period of even several seconds. FIG. 6 is a block diagram of a processing module for synchronizing clocks between two platforms, according to an alternate embodiment. FIG. 6 is one example of the processing module 420 in FIG. 4A. In situations where the phase fluctuations due to turbulence make it challenging to extract the phase of each photodetector signal directly, each signal can be mixed down to two intermediate frequencies with mixers 610A and 610B and a pair of frequencies $f_{LO1}$ and $f_{LO2}$ generated by a frequency synthesizer 605 at slightly different frequencies. The intermediate frequencies are mixed by a third mixer 610C to generate a tone at the difference frequency, which can be demodulated by an IQ demodulator 615 at the difference frequency of the two original synthesizers to extract the phase difference between the original two signals. The rest of the signal processing can be the same as discussed above in FIG. 5. As a specific example, two distributed feedback (DFB) lasers designed for the dense wavelength-division multiplexing (DWDM) ITU grid could be used for the TT system, referenced to a 1560 nm Erbium fiber frequency comb used as the optical frequency divider at each site. A good compromise between precision and dynamic range is to choose lasers on two adjacent ITU channels, such that their frequency separation is ~100 GHz. With this frequency separation, 0-$2\pi$ phase range on $\psi^A - \psi^B$, corresponds to a timing deviation range of 10 ps. A modest signal-noise-ratio (SNR) of 2500:1 at 1 second of integration time is sufficient to measure the relative time offset of the two sites with a precision of 1 fs.

Figure 7:
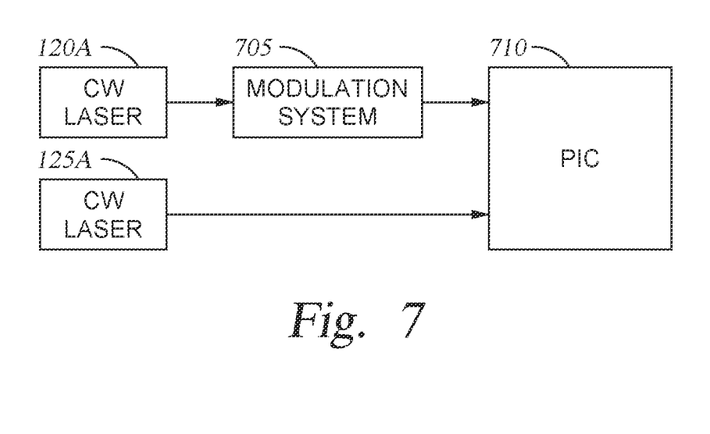
FIG. 7 illustrates using a modulation system when performing continuous wave two-way optical time transfer, according to one embodiment.

Taking the sum of the phase measurements $(\psi^A + \psi^B)$ instead of the difference allows the platforms to measure the path length between the two sites with sub-nm precision and could be used for ranging applications. As mentioned above, while ambiguity range of the system does not pose a big challenge for syntonization, for synchronization or ranging applications, an unambiguous knowledge of timing offset or the link path may be desired. One way to extend the dynamic range of the system is to include sidebands on one of the CW lasers with a modulation system, an example of which is shown in FIG. 7. The modulation frequency of the phase modulation defines another synthetic wavelength $(\lambda_{mod} = c/f_{mod})$ and a timing deviation range $(1/f_{mod})$ that may be utilized to resolve the typically millimeter (ps) range ambiguity of the synthetic wavelength (timing deviation) defined by the two CW lasers.

FIG. 7 illustrates using a modulation system 705 when performing a CW optical TT, according to one embodiment. Examples of the modulation system 705 can include an optical single sideband modulator or a combination of an electro-optic modulator (EOM) with an amplitude modulator. FIG. 7 illustrates disposing the modulation system 705 between the CW laser 120A and a PIC 710. The PIC 710 can be the PIC 400 in FIG. 4A, or the PIC 800, the PIC 900, or the PIC 1000 discussed in FIGS. 8-10.

For applications where synchronization is required or laser ranging, unambiguous knowledge of the timing offset or the link path is required. This means the ambiguity range of the system should be extended until a more conventional ranging/synchronization system can resolve the offset (with less precision). Adding the modulation system 705 to one of the lasers to create a sideband at a much smaller frequency offset than the frequency offset between the two CW optical signals creates a coarser but larger dynamic range measurement. For example, 100 MHz modulation frequency extends the ambiguity range to 3 meters or 10 ns. This ambiguity can easily be resolved with a conventional optical or RF link. Similar to the method described above, the signal from the photodiode that detects the modulated laser light is demodulated at the modulation frequency. A comparison of the extracted phases at the baseband and modulation frequency reveals the link distance. The modulation frequency of the modulation system 705 may be dynamically tuned to provide an adjustable ambiguity range.

Figure 9:
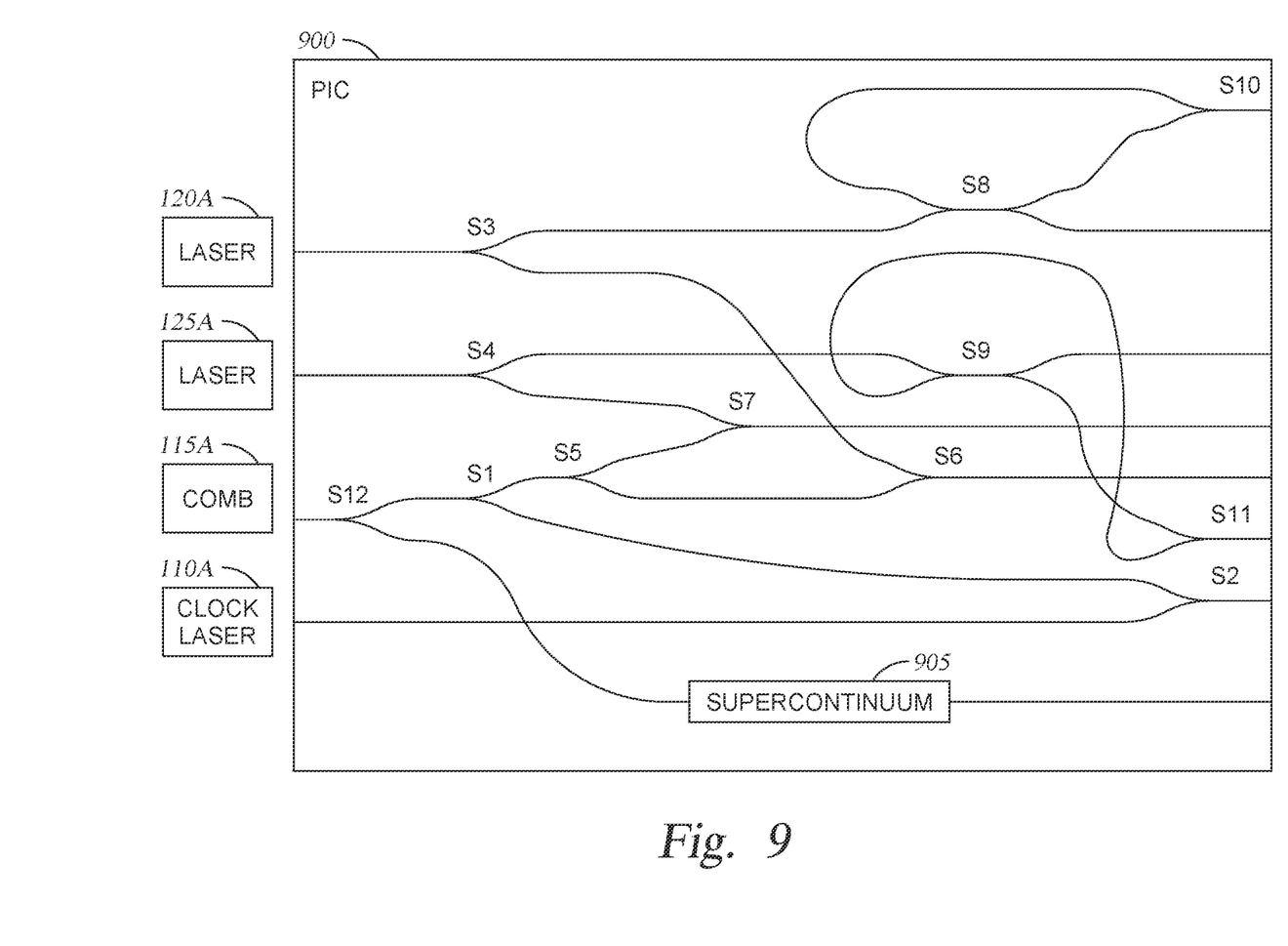
Figure 10:
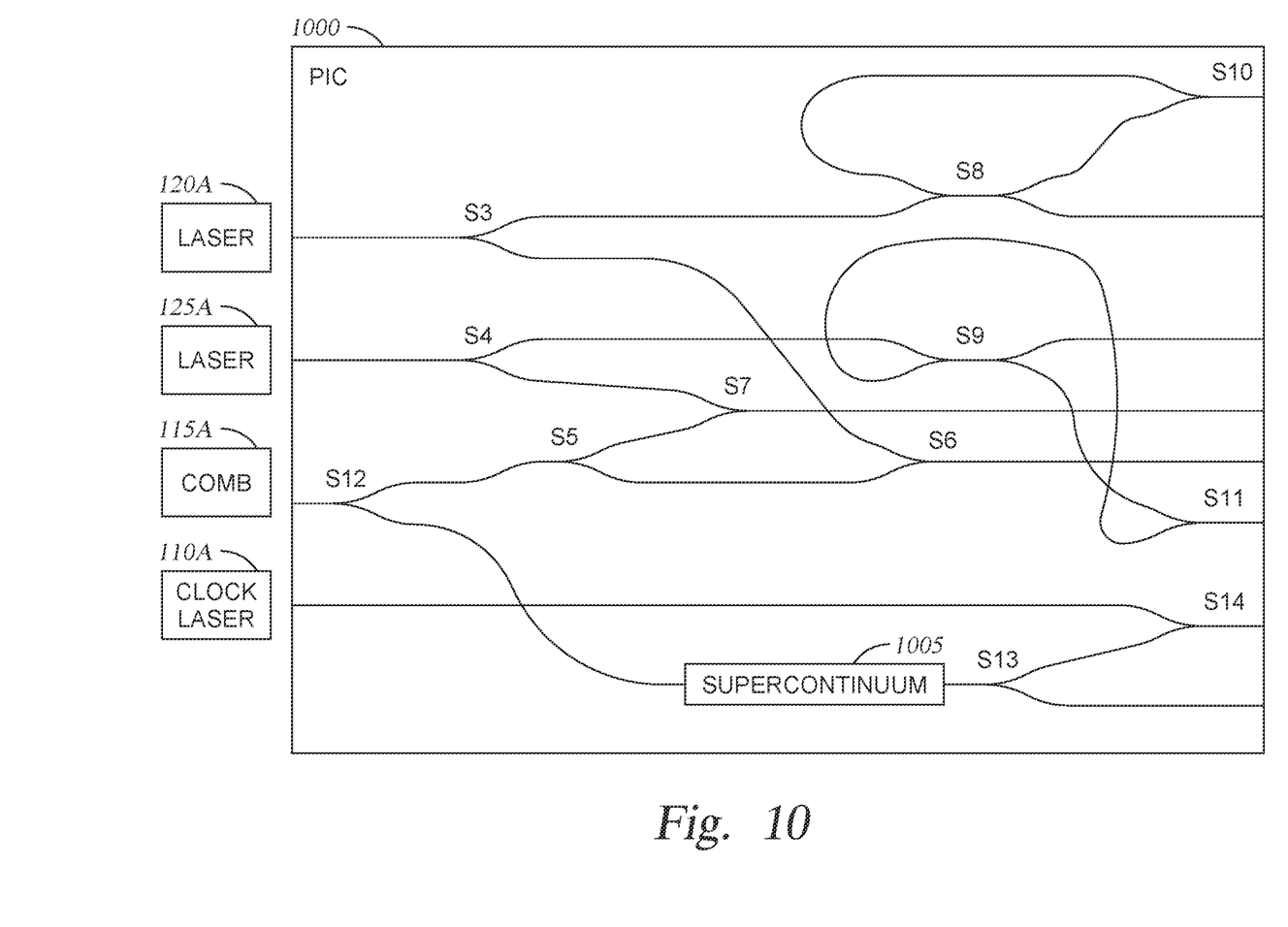

FIGS. 8-10 illustrate photonic integrated circuits, according to one embodiment. FIG. 8 illustrates a PIC that includes an additional splitter S12 and a loop mirror 805 on the clock laser 110A input for Doppler cancellation of the clock light. The loop mirror 805 retro-reflects a portion of the clock light back to the clock laser 110A and can be compared to the outgoing light to cancel out phase shifts due to changes in the optical path between the clock laser 110A and the PIC 800.

FIG. 9 illustrates a PIC 900 that includes supercontinuum generation region 905 for self-referencing of the optical frequency comb 115A. In this example, the comb light is split in two with an additional splitter S12 at the input and some portion of the light is used to generate an octave spanning supercontinuum to generate the f-2f self-referencing signal which can be used as a feedback signal along with the feedback path 415A shown in FIG. 4A.

The advantage of this implementation is that all degrees of freedom of the comb 115A and the CW TT system are stabilized using a single PIC 900, which eliminates all out-of-loop paths for improved temperature stability. In this implementation, the PIC 900 would be made of a nonlinear material such as silicon nitride, lithium niobate, or tantalum pentoxide.

FIG. 10 illustrates a PIC 1000 that includes supercontinuum generation region 1005 for cases where the clock laser is not within the original bandwidth of the comb spectrum. Supercontinuum generation region 1005 can be employed to extend the bandwidth of the comb 115A to the clock laser frequency to enable the optical beatnote on the PIC 1000. This includes the use of the optical splitters S12, S13, and S14 in order to combine the frequency comb 115A with the clock laser 110A.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A system, comprising:
    an optical subsystem configured to:
        lock a frequency comb to a clock in a first platform, and
        lock two continuous wave (CW) optical signals in the first platform to the frequency comb, wherein the two CW optical signals have different frequencies; and
    an electrical subsystem configured to determine a timing deviation between the clock in the first platform and a clock in a second platform based on exchanging, in free space, the two CW optical signals generated in the first platform with two CW optical signals generated in the second platform.

2. The system of claim 1, wherein the optical subsystem is configured to combine a first CW optical signal generated in the first platform with a second CW optical signal received from the second platform and a third CW optical signal generated in the first platform with a fourth CW optical signal received from the second platform.

3. The system of claim 2, wherein the frequency of the first and second CW optical signals are the same or have a known offset and the frequency of the third and fourth CW optical signals are the same or have a known offset.

4. The system of claim 2, wherein the electrical subsystem comprises a processing module configured to:
    generate a first combined signal based on a combination of a first electrical signal derived from combining the first and second CW optical signals with a second electrical signal derived from combining the third and fourth CW optical signals;
    transmit a demodulated phase of the first combined signal to the second platform; and
    receive a demodulated phase of a second combined signal from the second platform.

5. The system of claim 1, wherein locking the frequency comb to the clock in the first platform comprises:
    combining an optical signal generated by the frequency comb with a clock laser and using an electrical signal derived from a combination of the optical signal and the clock laser in a feedback path to control the frequency comb.

6. The system of claim 1, wherein locking the two CW optical signals in the first platform to the frequency comb comprises:
    combining an optical signal generated by the frequency comb with both of the two CW optical signals in the first platform; and
    using electrical signals derived from the combinations of the optical signal generated by the frequency comb with both of the two CW optical signals to control CW lasers generating the two CW optical signals in the first platform.

7. The system of claim 1, wherein the optical subsystem is part of a photonic integrated circuit (PIC) comprising splitters for locking the frequency comb to the clock in the first platform and locking two CW optical signals in the first platform to the frequency comb.

8. The system of claim 7, wherein the PIC comprises a loop mirror configured to receive a portion of an optical signal generated by a clock laser and reflect the optical signal back to the clock laser.

9. The system of claim 7, wherein the PIC comprises a supercontinuum generation region configured to generate an octave spanning supercontinuum to generate a self-referencing signal to use as a feedback signal for the frequency comb.

10. The system of claim 9, wherein an output of the supercontinuum generation region is combined with a clock laser, where the clock laser is not within a bandwidth of the spectrum of the frequency comb.

11. The system of claim 1, further comprising:
    a first CW laser configured to generate a first one of the two CW optical signals in the first platform; and
    a modulator system configured to receive the first one of the two CW optical signals and to create a sideband at a smaller frequency offset than a frequency offset between the two CW optical signals in the first platform.

12. A method, comprising:
    locking a frequency comb to a clock in a first platform;
    locking two continuous wave (CW) optical signals in the first platform to the frequency comb, wherein the two CW optical signals have different frequencies; and
    determining a timing deviation between the clock in the first platform and a clock in a second platform based on exchanging, in free space, the two CW optical signals generated in the first platform with two CW optical signals generated in the second platform.

13. The method of claim 12, further comprising:
combining a first CW optical signal generated in the first platform with a second CW optical signal received from the second platform; and
combining a third CW optical signal generated in first platform with a fourth CW optical signal received from the second platform.

14. The method of claim 13, wherein the frequency of the first and second CW optical signals are the same or have a known offset and the frequency of the third and fourth CW optical signals are the same or have a known offset.

15. The method of claim 13, further comprising:
generating a first combined signal based on a combination of a first electrical signal derived from combining the first and second CW optical signals with a second electrical signal derived from combining the third and fourth CW optical signals;
transmitting a demodulated phase of the first combined signal to the second platform; and
receiving a demodulated phase of a second combined signal from the second platform.

16. The method of claim 12, wherein locking the frequency comb to the clock in the first platform comprises:
combining an optical signal generated by the frequency comb with a clock laser and using an electrical signal derived from a combination of the optical signal and the clock laser in a feedback path to control the frequency comb.

17. The method of claim 12, wherein locking the two CW optical signals in the first platform to the frequency comb comprises:
combining an optical signal generated by the frequency comb with both of the two CW optical signals in the first platform; and
using electrical signals derived from the combinations of the optical signal generated by the frequency comb with both of the two CW optical signals to control CW lasers generating the two CW optical signals in the first platform.

18. A system, comprising:
a first platform configured to transmit, in free space, two continuous wave (CW) optical signals having different frequencies to a second platform; and
the second platform is configured to transmit, in free space, two CW optical signals having different frequencies to the first platform,
wherein the first and second platforms are configured to synchronize high-precision clocks based on exchanging the CW optical signals.

19. The system of claim 18, wherein the first platform is configured to combine a first CW optical signal generated in the first platform with a second CW optical signal received from the second platform and a third CW optical signal generated in the first platform with a fourth CW optical signal received from the second platform,
wherein the second platform is configured to combine the second CW optical signal generated in the second platform with the first CW optical signal received from the first platform and the fourth CW optical signal generated in the second platform with the third CW optical signal received from the first platform.

20. The system of claim 19, wherein the frequency of the first and second CW optical signals are the same or have a known offset and the frequency of the third and fourth CW optical signals are the same or have a known offset.

* * * * *